Figure 1:
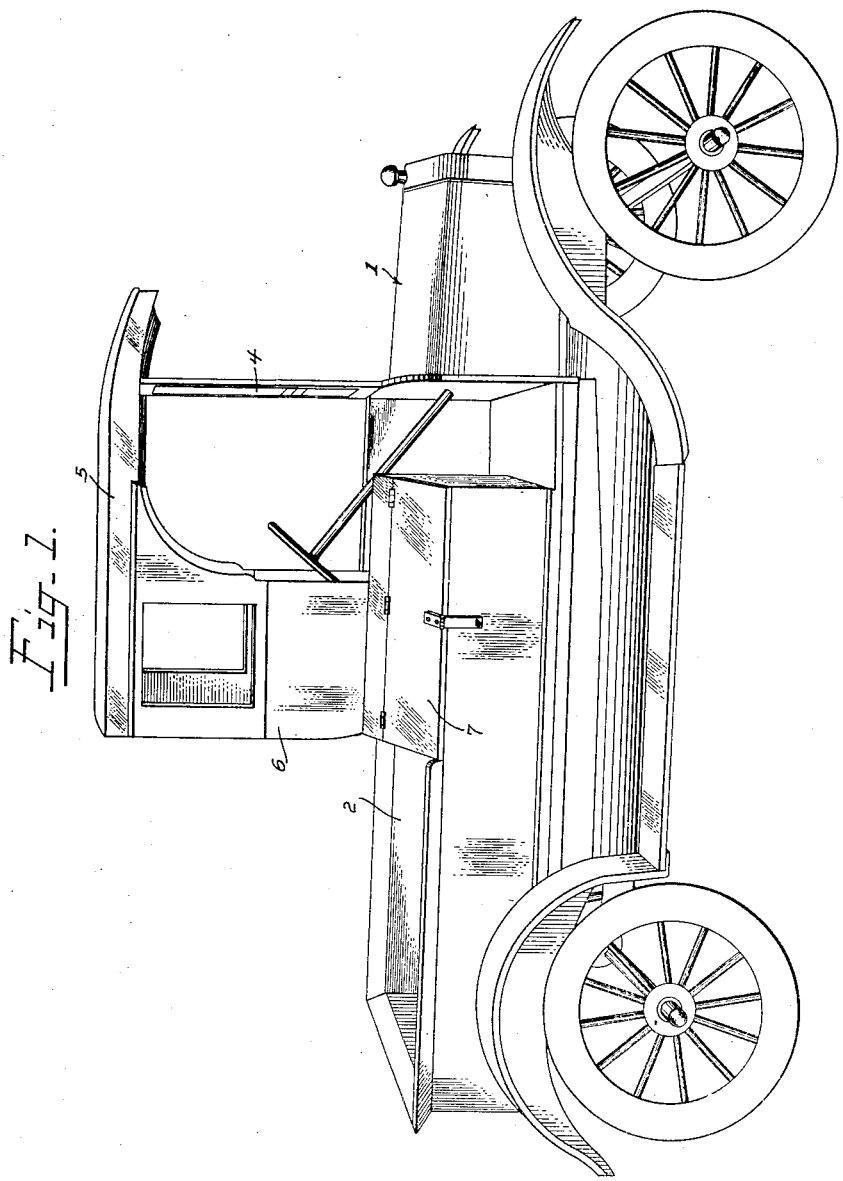

F. M. HOBLITT.
VEHICLE BODY.
APPLICATION FILED APR. 6, 1920.

1,349,959.

Patented Aug. 17, 1920.
2 SHEETS—SHEET 1.

Inventor
FREDERIC M. HOBLITT
By his Attorney
Ernest Hopkinson

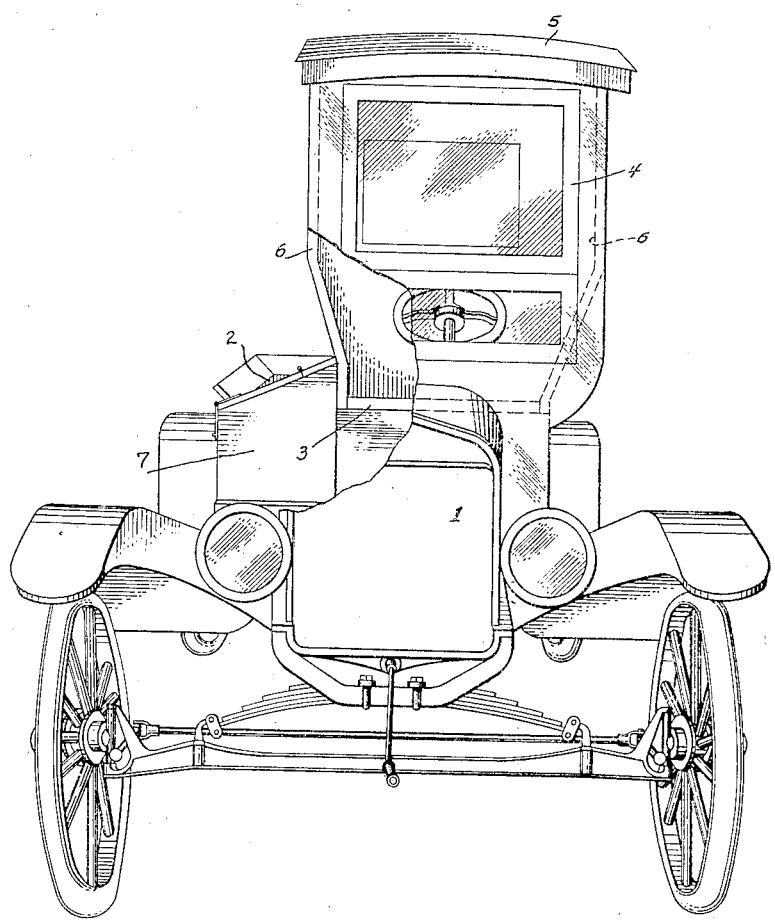

UNITED STATES PATENT OFFICE.

FREDERIC M. HOBLITT, OF NEW YORK, N. Y.

VEHICLE-BODY.

1,349,959. Specification of Letters Patent. Patented Aug. 17, 1920.

Application filed April 6, 1920. Serial No. 371,731.

*To all whom it may concern:*

Be it known that I, FREDERIC M. HOBLITT, a citizen of the United States, residing at New York, county of New York, and State of New York, have invented certain new and useful Improvements in Vehicle-Bodies, of which the following is a full, clear, and exact description.

This invention relates to a vehicle body, more particularly to a body designed for use on a service or delivery car.

A common trouble with business houses having cars for salesmen, agents, etc., or for delivery purposes is the unauthorized use of such cars by the operators for purposes of their own, such as the taking of their friends on so-called "joy rides." This results in considerable loss of time, failure of prompt delivery of articles ordered by customers, excessive gasolene and oil bills, and general unnecessary wear and tear on the car.

An object of my invention is to provide a vehicle body so designed as to discourage the use of the car for other than its legitimate purpose by rendering it practically impossible to carry passengers therein with any comfort.

A further object of my invention is to provide a conveniently located receptacle for tools, spare parts, etc.

For a complete disclosure of my invention reference is had to the following specification and accompanying drawings, in which latter—

Figure 1 is a side view of a service car provided with my new form of vehicle body and Fig. 2 is a front view thereof with parts broken away.

Referring to the drawings, the numeral 1 designates the car generally in the present instance shown as a delivery car, the rear of which is provided with the usual space 2 for the articles to be carried, which space may be arranged in any desired manner and may be open or closed, according to the purpose for which the car is to be used. At the point where a double seat usually extends transversely across the body a seat 3 extends from one side in alinement with the steering wheel, and is of a width just sufficient to accommodate the chauffeur. A windshield 4 is provided which is of a width corresponding to the seat, as are also the stop 5 and side walls 6 inclosing the seat. In the present instance the space alongside of the seat 3, which ordinarily would form a continuation thereof, is utilized as a receptacle 7, having a top which is inclined from adjacent the seat sharply downwardly to the opposite side of the vehicle from the seat. This receptacle and its top are, however, of greater length than the depth of the seat, being extended forwardly about half the distance between the seat and dash, as shown in Fig. 1. Thus neither the space alongside the chauffeur's seat nor the floor in front of said space can be used as a seat. Sufficient room is left, however, for the chauffeur to get in and out.

By reason of the above construction there will be no seating space on the car for anyone other than the chauffeur, and as there will be no way by which a passenger can be carried except by standing on the fender or riding in the rear portion of the car, it will be seen that joy riding will be prevented for all practical purposes. While in the specific form shown the side wall 6 and inclined top of the receptacle 7 form the particular means for preventing the use of the space alongside the chauffeur's seat by a passenger, it is obvious that other means may be provided for accomplishing the same purpose, such as a relatively tall receptacle extending up to the side window of the wall 6, or such other obvious means of preventing its use as a seat as will be suggested by the present disclosure.

Having thus described my invention, what I claim and desire to protect by Letters Patent is:

1. In a vehicle body, an individual operator's seat of less width than that of the body, and means for preventing the use as a seat of the body portion at the side of said seat or the floor in front of said body portion.

2. In a vehicle body, a seat located at one side thereof and of a width just sufficient to accommodate a single person, side walls for said seat, and means for preventing the use as a seat of the portion of said body alongside the seat.

3. In a vehicle car body, an individual operator's seat in alinement with the steering wheel, a top and windshield of a size corresponding to the width of the seat, and means for preventing the use as a seat of the body portion at the side of said seat and top.

4. In a service car body, an operator's seat extending from one side of the body partly toward the other side and of a width just sufficient to accommodate a single person, a top and side walls for said seat of a corresponding width, and a sharply inclined surface at the side of said seat extending from said seat to the other side of the body and also extending in advance of the seat.

5. In a vehicle body, a single operator's seat extending from one side partly across the body, a top above said seat having side walls inclosing said seat, a windshield of a width corresponding to said seat, a dash, and a receptacle extending from said seat to the other side of the body and having a cover inclined sharply downward toward said last named side of the body, said receptacle and cover also extending forwardly of the seat to partly shut off the space between the seat and dash.

Signed at New York, N. Y., this 17th day of March, 1920.

FREDERIC M. HOBLITT.